Patented June 26, 1951

2,558,025

UNITED STATES PATENT OFFICE 2,558,025

POLYESTER DRYING OIL

Zeno W. Wicks, Jr., New York, N. Y., assignor to Interchemical Corporation, New York, N. Y., a corporation of Ohio No Drawing. Application September 11, 1947, Serial No. 773,524

8 Claims. (Cl. 260—410.6)

This invention relates to synthetic oils of type consisting of polyhydric alcohol esters of monocarboxylic acids.

Vegetable and animal oils consist chiefly of the glycerol esters of aliphatic monocarboxylic acids. The physical and chemical properties of these oils are dependent upon the particular monocarboxylic acids that are esterified with the glycerol. Oils containing relatively high percentages of polyunsaturated high molecular weight monocarboxylic acid can dry by combination of oxygen of the air with the ethylenic bonds of the unsaturated acids. This property of the oils is responsible for their use in many air drying coating compositions such as paints, enamels and varnishes.

In addition to the naturally occurring polyhydric alcohol ester oils numerous modified or synthetic oils are known and these have certain advantages over the natural oils. For instance, castor oil as it occurs in nature is non-drying but by a special dehydration treatment a modified castor oil or dehydrated castor oil is produced. The dehydrated castor oil has drying properties superior to most of the naturally occurring drying oils.

The preparation of synthetic polyester oils has, in general, been approached from the standpoint of drying oils. For instance, new synthetic polyester drying oils have been prepared by esterifying a polyhydric alcohol, as pentaerythritol, with the fatty acids derived from natural drying oils or dehydrated castor oil.

It has now been discovered that a new general type of synthetic polyester oil can be prepared from polyhydric alcohols by substantially completely esterifying the polyhydric alcohols with at least three different types of carboxylic acids. The properties of these new oils can be varied considerably by varying the ratios in which the different types of acids are esterified with the polyhydric alcohols. Hence, by varying the properties of the oil product obtained, a series of very useful synthetic oils can be obtained.

Theoretically, the molecular ratio of each type of carboxylic acid used to the amount of polyhydric alcohol can vary over any range from a fraction of a mole of acid per mole of polyhydric alcohol, up to approximately the same number of moles of acids, per mole of alcohol, as there are hydroxyl groups in the alcohol. As a practical matter, however, it has been found that a substantial fraction of the hydroxyl groups of alcohol must be esterified with a particular type of acid before the modifying effect of that acid is noticeable to any great extent in the final oil product. In most cases this modifying effect will be appreciable enough to be easily recognized when about 10 percent of the hydroxyl groups are esterified with the modifying acid. For instance, using pentaerythritol, the esterification of a fraction of the hydroxyl groups equivalent to about .4 mole of hydroxyl would produce a noticeable effect. In certain other instances, as is pointed out hereinafter, the use to which the synthetic oil is to be put necessitates the use of more than the 10 per cent modification for one or more of the modifying acids. This limitation, however, is not a limitation on the broad generic scope of the invention.

Polyhydric alcohols that can be used in the process of the present invention include those which contain at least three hydroxyl groups, preferably those which contain three to ten hydroxyl groups. Specific examples of polyhydric alcohols that may be used are: glycerol, trimethylol propane, erythritol, pentaerythritol, mannitol, sorbitol, dipentaerythritol and tripentaerythritol, polyglycerol and polyallylalcohol.

The novel oils prepared according to the process of the present invention may be designated as a polyester compound having the general formula

where R is a residue of a polyhydric alcohol containing at least three hydroxyl groups, for instance, using pentaerythritol, the residue would have the formula

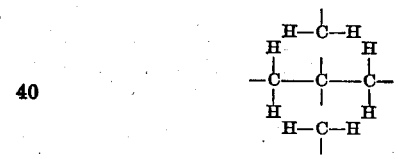

Likewise, X represents an acid radical of a water-insoluble saturated or ethylenically unsaturated aliphatic monocarboxylic acid, Y represents the acid radical of a water-soluble saturated aliphatic monocarboxylic acid, Z represents the acid radical of a monocarboxylic acid containing an aromatic nucleus in the molecule wherein the aromatic nucleus comprises at least about 50% by weight of the acid, and $x$, $y$ and $z$ represent the number of moles of X, Y and Z respectively, which are combined with the polyhydric alcohol residue. Also, the numerical sum of $x$, $y$, and $z$ is substantially equal to the number of hydroxyl groups present in the polyhydric alcohol.

Water-insoluble aliphatic monocarboxylic acids, from which X substituents in the above general formula are derived, may be either saturated or ethylenically unsaturated cyclic or acyclic acids. However, the 12–22 carbon acids which occur in drying and semi-drying oils such as soy oil, linseed oil, tung oil, dehydrated castor oil, fish oils, and the like, are especially preferred because they are more readily available in commercial quantities. Other insoluble fatty acids that are operable include sorbic acid, caproic acid, capric acid, naphthenic acids, cyclohexyl acetic acid, etc.

Examples of water-soluble acids, from which substituent Y in the general formula is obtained, are acetic acid, propionic acid, butyric acid, and isobutyric acid. These acids may contain substituent groups, as chlorine, if such groups are unreactive under the conditions used to form the polyester oils. Also, other water soluble acids, such as levulinic acid, are operable.

The acids of the group containing an aromatic nucleus in the molecule are preferably those acids containing one aromatic nucleus in which the aromatic nucleus constitutes a substantial portion of the molecule, i. e. those in which the aromatic nucleus constitutes at least about 50% by weight of the acid molecule, as, for instance, benzoic acid, toluic acids, phenylacetic acid, phenoxyacetic acid, and the like. Also the substituted acids such as chlorobenzoic or polychlorobenzoic acid can be used. Naphthoic acids are, in general, not preferred due to the fact that they decarboxylate more readily than the benzoic acids. Also, acids containing substituent groups that are reactive under the conditions of the process of the invention are not preferred. For example, nitrobenzoic acid would not be preferred because the nitrogroup tends to decompose during the course of the esterification reaction.

In the preparation of the novel oils of the present invention, the three different types of acids may be esterified in a desired ratio with the polyhydric alcohols in any of the usual methods of esterification. The preferred procedure is to first esterify the polyhydric alcohol with a mixture of the desired amounts of water-insoluble fatty acid and the monocarboxylic acid containing an aromatic nucleus, and then esterify the product with the water-soluble acid or its anhydride, e. g. acetic anhydride. The esterification is preferably carried out by heating the reactants to a suitable reaction temperature, in the presence or absence of an esterification catalyst, until esterification is substantially complete.

The properties of the polyester oils obtained by the process of the invention vary considerably depending upon the ratios of the reactants employed and upon the particular reactants themselves. In general, the oils will have air-drying properties if more than two moles of polyunsaturated fatty acid have been esterified with one mole of polyhydric alcohol. If the ratio of polyunsaturated fatty acid is less than two moles for each molecule of polyhydric alcohol the polyester oil will be substantially non-drying; however, if such a non-drying oil, containing as low as about 1.2 moles of polyunsaturated acid per mole of polyhydric alcohol, is mixed with a drying oil the mixture will dry in the usual manner. Such oils of course are useful as vehicles for many types of coating compositions.

The compatibility of the novel oils with alkyd resins and nitrocellulose, both in solution and in dried films, is increased by increasing the percentage of water-soluble acid in the oil. And, in general, the compatibility of the oils with alkyds is increased by increasing the proportion of acid containing an aromatic nucleus. Also, an increase in the proportion of water-soluble acid tends to increase the solubility of the oil in the volatile solvents commonly used in the varnish and lacquer industries. The presence of larger proportions of acids containing an aromatic nucleus also tends to increase the solubility of the oil in the common varnish and lacquer solvents, such as aliphatic and aromatic hydrocarbons, alcohols, ketones, esters, etc. The water-insoluble acid portion increases the solubility of the oils in aliphatic hydrocarbon solvents and increases the compatibility of the synthetic oils with other oils.

The following examples, in which the parts are by weight, further illustrate the manner in which the invention may be practiced.

*Example I*

A mixture of 1792 parts of dehydrated castor oil fatty acids, 1459 parts of phenoxyacetic acid, and 1094 parts of polypentaerythritol, consisting of substantially equal parts by weight of di- and tripentaerythritol, was heated to 240° C. and maintained at that temperature for two hours under carbon dioxide atmosphere. After cooling to about 100° C., 1350 parts of acetic anhydride were added and the mixture was then refluxed for three hours. At the end of this time, and after the excess acetic anhydride and acetic acid had been removed by vacuum distillation, the resulting oil had a viscosity of 41 poises and an acid number of 6.2. The oil was compatible with linseed oil, nitrocellulose lacquers, and oil modified alkyds.

*Example II*

A mixture of 430 parts of benzoic acid, 560 parts of dehydrated castor oil fatty acids and 343 parts polypentaerythritol (a mixture of substantially equal parts by weight of di- and tripentaerythritol) was heated to 230° C. and kept at that temperature with stirring under carbon dioxide for two hours. After cooling to 100° C., 410 parts of acetic anhydride were added and then the reaction mixture was refluxed for three hours. The excess acetic anhydride and acetic acid were removed by vacuum distillation to give an oil of a viscosity of 54 poises and an acid number of 4.3.

*Example III*

A mixture of 304 parts of phenoxyacetic acid, 840 parts of dehydrated castor oil fatty acids, and 343 parts of polypentaerythritol, consisting of substantially equal parts by weight of di- and tripentaerythritol, was heated at 250° C. for two hours with vigorous stirring under an atmosphere of carbon dioxide. After cooling to 180° C., 244 parts of levulinic acid were added and the temperature then was raised slowly to 230° C. and kept there for two and a half hours. The resultant oil had a viscosity of 27 poises and an acid number of 13.

*Example IV*

A mixture of 420 parts of soya fatty acids, 122 parts of benzoic acid and 251 parts of commercial dipentaerythritol was heated at 230–250° C. for four hours. The resultant product was refluxed with 420 parts of acetic anhydride for two hours and then the acetic acid and excess acetic anhydride were removed by vacuum distillation. The oil left as a residue had an acid number of 1.7 and a viscosity of 22 poises.

Example V

A polyester oil similar to that of Example IV was prepared from 280 parts of soy fatty acids, 122 parts of commercial dipentaerythritol and 480 parts of acetic anhydride. This oil had an acid number of 1.6 and a viscosity of 12.5 poises.

Example VI

A mixture of 92 parts of glycerol, 288 parts of soy fatty acids and 122 parts of benzoic acid was heated with stirring under carbon dioxide for two hours at 180° C. and then for four hours at 250° C. The product was refluxed with 150 parts of propionic anhydride for two hours and then propionic acid and excess propionic anhydride were removed by vacuum distillation. The oil obtained as residue had an acid number of 1.8 and a viscosity of 1.2 poises.

Example VII

A mixture of 210 parts of soy acids, 95 parts of 2,4-dichlorobenzoic acid, and 125 parts of commercial dipentaerythritol was heated with stirring under carbon dioxide at about 180° C. for two hours and then at 250° C. for four hours. This product was refluxed with 185 parts of acetic anhydride for about two hours and then the acetic acid and excess acetic anhydride removed by vacuum distillation. The oil obtained as residue had an acid number of 1.4 and a viscosity of 31 poises.

Example VIII

A mixture of 420 parts of soy fatty acids, 156 parts of p-chlorobenzoic acid, 252 parts of commercial dipentaerythritol and 350 parts of acetic anhydride was heated to form an oil in a manner similar to that of Example VII. The oil had an acid number of 2.5.

Example IX

A mixture of 31.9 parts of soy fatty acids, 9.2 parts of benzoic acid and 20.9 parts of sorbitol (commercial grade) was heated to 230° C. until esterification was complete (about four hours). The resultant product was refluxed with 38 parts of acetic anhydride for about two hours and then the acetic acid and excess acetic anhydride were removed by vacuum distillation. The oil left as residue had an acid number of 1.2 and a viscosity of 3.7 poises.

Example X

Using procedures similar to the above, oils were prepared containing the following approximate molar ratios of acids and polyhydric alcohols:

A 2 moles dehydrated castor oil fatty acids
3 moles phenoxyacetic acid
2 moles acetic acid
1 mole polypentaerythritol (a mixture of substantially equal parts of di- and tripentaerythritol)

B 2 moles linseed fatty acids
3 moles phenoxyacetic acid
2 moles acetic acid
1 mole polypentaerythritol (approximately 0.5 mole each of di- and tripentaerythritol)

C 3 moles linseed fatty acids
2 moles phenoxyacetic acid
2 moles levulinic acid
1 mole polypentaerythritol (approximately 0.5 mole each of di- and tripentaerythritol)

D 3 moles dehydrated castor oil fatty acid
2 moles phenoxyacetic acid
2 moles levulinic acid
1 mole polypentaerythritol (approximately 0.5 mole each of di- and tripentaerythritol)

E 2 moles dehydrated castor oil fatty acids
3 moles benzoic acid
2 moles acetic acid
1 mole polypentaerythritol (approximately 0.5 mole each of di- and tripentaerythritol)

F 2 moles dehydrated castor oil fatty acids
2 moles phenoxyacetic acid
3 moles acetic acid
1 mole polypentaerythritol (approximately 0.5 mole each of di- and tripentaerythritol)

G 2 moles soy fatty acids
2 moles phenoxyacetic acid
3 moles acetic acid
1 mole polypentaerythritol (approximately 0.5 mole each of di- and tripentaerythritol)

H 1.5 moles soy fatty acids
1 mole phenoxyacetic acid
4.5 moles acetic acid
1 mole polypentaerythritol (approximately 0.5 mole each of di- and tripentaerythritol)

I 1.5 moles soy fatty acids
1 mole benzoic acid
4.5 moles acetic acid
1 mole polypentaerythritol (approximately 0.5 mole each of di- and tripentaerythritol)

J 1.5 moles soy fatty acids
2 moles phenoxyacetic acid
3.5 moles acetic acid
1 mole polypentaerythritol (approximately 0.5 mole each of di- and tripentaerythritol)

K 3 moles soy fatty acids
1 mole benzoic acid
3 moles acetic acid
1 mole polypentaerythritol (approximately 0.5 mole each of di- and tripentaerythritol)

Since numerous and varied modifications of the invention may be practiced according to the teachings of the above description and examples of the invention it is intended that the scope of the invention is to be limited only by valid scope of the appended claims.

I claim:

1. A polyester drying oil comprising a substantially completely esterified polyhydric alcohol, the polyester having the general formula $$X_x\text{—R—Y}_y$$
$$|$$
$$Z_z$$

where R is a polyhydric alcohol residue of an alcohol containing at least three hydroxyl groups, X is a radical of polyunsaturated aliphatic monocarboxylic acid containing 12 to 22 carbon atoms, Y is a radical of a water-soluble saturated aliphatic monocarboxylic acid containing at least two carbon atoms, Z is a radical of a monocarboxylic acid containing an aromatic nucleus, and $x$, $y$ and $z$ represent the number of moles of X, Y and Z respectively, which are combined with the polyhydric alcohol residue, where $x$ is more than 2 and each of $y$ and $z$ is at least as great as $\frac{1}{10}$ the sum of $x$, $y$ and $z$.

2. A polyester drying oil as defined in claim 1 wherein Y is the acetate radical.

3. A polyester drying oil as defined in claim 1 wherein R is the residue of dipentaerythritol.

4. A polyester drying oil as defined in claim 1 wherein R is the residue of sorbitol.

5. A polyester drying oil as defined in claim 2 wherein R is the residue of sorbitol.

6. A polyester drying oil as defined in claim 2 wherein Z is the benzoate radical.

7. A polyester drying oil as defined in claim 5 wherein Z is the phenoxyacetate radical.

8. A polyester drying oil as defined in claim 5 wherein Z is the benzoate radical.

ZENO W. WICKS, Jr.

REFERENCES CITED

The following references are of record in the file of this patent:

UNITED STATES PATENTS

| Number | Name | Date |
|---|---|---|
| 2,145,443 | Harris | Jan. 31, 1939 |
| 2,381,888 | Agre | Aug. 14, 1945 |